United States Patent
Rhodes

(10) Patent No.: US 10,787,027 B2
(45) Date of Patent: Sep. 29, 2020

(54) ILLUSTRATION ROBOT MOVEMENT

(71) Applicant: SPHERO, INC., Boulder, CO (US)

(72) Inventor: Richard Rhodes, Broomfield, CO (US)

(73) Assignee: SPHERO, INC., Boulder, CO (US)

( * ) Notice: Subject to any disclaimer, the term of this patent is extended or adjusted under 35 U.S.C. 154(b) by 310 days.

(21) Appl. No.: 15/981,972

(22) Filed: May 17, 2018

(65) Prior Publication Data

US 2018/0333981 A1 Nov. 22, 2018

Related U.S. Application Data

(60) Provisional application No. 62/507,583, filed on May 17, 2017.

(51) Int. Cl.
*B43L 13/02* (2006.01)
*B25J 11/00* (2006.01)
*B25J 9/16* (2006.01)
*B25J 5/00* (2006.01)

(52) U.S. Cl.
CPC ............ *B43L 13/022* (2013.01); *B25J 5/007* (2013.01); *B25J 9/1684* (2013.01); *B25J 9/1692* (2013.01); *B25J 11/0075* (2013.01)

(58) Field of Classification Search
CPC ...... B43L 13/022; B25J 5/007; B25J 11/0075; B25J 9/1684; B25J 9/1692
See application file for complete search history.

(56) References Cited

U.S. PATENT DOCUMENTS

| | | | | |
|---|---|---|---|---|
| 5,652,603 A | * | 7/1997 | Abrams | G06F 3/016 |
| | | | | 33/516 |
| 5,724,264 A | * | 3/1998 | Rosenberg | G01B 5/008 |
| | | | | 702/152 |
| 2008/0192104 A1 | * | 8/2008 | Nye | B29C 64/20 |
| | | | | 347/110 |
| 2014/0146308 A1 | | 5/2014 | Burke | |
| 2015/0266528 A1 | | 9/2015 | Matsue et al. | |
| 2016/0059408 A1 | | 3/2016 | Isobe | |

(Continued)

FOREIGN PATENT DOCUMENTS

| | | |
|---|---|---|
| JP | 06-149357 | 5/1994 |
| JP | 2001276441 A * | 10/2001 |

(Continued)

OTHER PUBLICATIONS

JP 2001276441 Translation (Year: 2001).*

(Continued)

*Primary Examiner* — Khoi H Tran
*Assistant Examiner* — Kyle T Johnson

(57) ABSTRACT

Aspects of the present disclosure relate to illustration robot movement. In examples, a destination location may specify a location to which the illustration robot should move a writing instrument from its current location. In some examples, the robot may not be parallel to the vector from the location of the writing instrument to the destination location, such that the robot may need to rotate or turn in order to create the illustration. Accordingly, the robot may move along an arc determined to cause the writing instrument to move tangent to the vector. Further, the arc may be periodically recalculated in order to maintain the movement of the writing instrument along the vector, rather than along an arc.

20 Claims, 6 Drawing Sheets

(56) References Cited

U.S. PATENT DOCUMENTS

| | | |
|---|---|---|
| 2016/0274588 A1 | 9/2016 | Tanaka |
| 2018/0009000 A1* | 1/2018 | Shang ........................ B25J 5/04 |
| 2018/0333981 A1* | 11/2018 | Rhodes .................. B25J 9/1692 |
| 2019/0025851 A1* | 1/2019 | Ebrahimi Afrouzi ........................ G05D 1/0219 |
| 2020/0024853 A1* | 1/2020 | Furrer .................... B25J 9/0087 |

FOREIGN PATENT DOCUMENTS

| | | | | |
|---|---|---|---|---|
| KR | 2018088054 | * | 8/2018 | |
| WO | WO-9302869 A1 | * | 2/1993 | ............... B43K 1/06 |
| WO | WO-2019126234 A1 | * | 6/2019 | ............. A63H 17/00 |

OTHER PUBLICATIONS

KR 2018088054 (Year: 2018).*
Artie 3000 Drawing Robot NPL (Year: 2019).*
WO_9302869_A1_Translation (Year: 1993).*
PCT International Search Report and Written Opinion in PCT/US2018/033249, dated Sep. 11, 2018, 10 pages.
PCT International Preliminary Report on Patentability in PCT/US2018/033249, dated Nov. 19, 2019, 6 pages.

\* cited by examiner

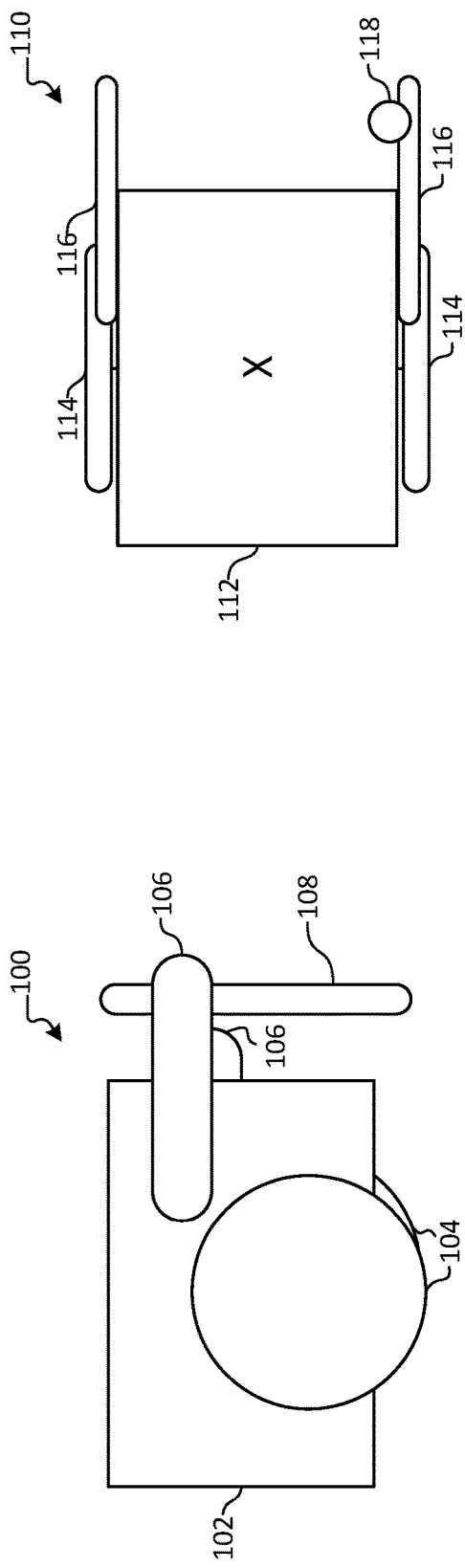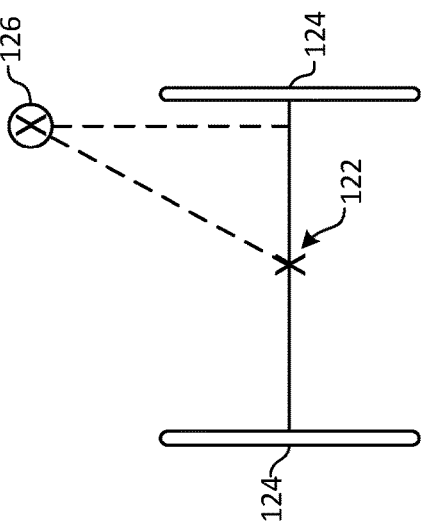

ILLUSTRATION ROBOT MOVEMENT

CROSS-REFERENCE TO RELATED APPLICATION

This application claims priority to U.S. Provisional Application No. 62/507,583, entitled "Illustration Robot Movement," filed on May 17, 2017, the entire disclosure of which is hereby incorporated by reference in its entirety.

BACKGROUND

A robot may generate an illustration using a writing instrument on an illustration surface. However, if the writing instrument is offset from the center of the robot, moving the writing instrument to create the illustration may require additional processing as compared to moving a writing instrument positioned at the center of the robot.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to illustration robot movement. In examples, a destination location may specify a location to which the illustration robot should move a writing instrument from its current location. In some examples, the robot may not be parallel to the vector from the location of the writing instrument to the destination location, such that the robot may need to rotate or turn in order to create the illustration. Accordingly, the robot may move along an arc determined to cause the writing instrument to move tangent to the vector. Further, the arc may be periodically recalculated in order to maintain the movement of the writing instrument along the vector, rather than along an arc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 1A-1C illustrate overviews of example aspects of a robot.

DETAILED DESCRIPTION

Figure 2A:
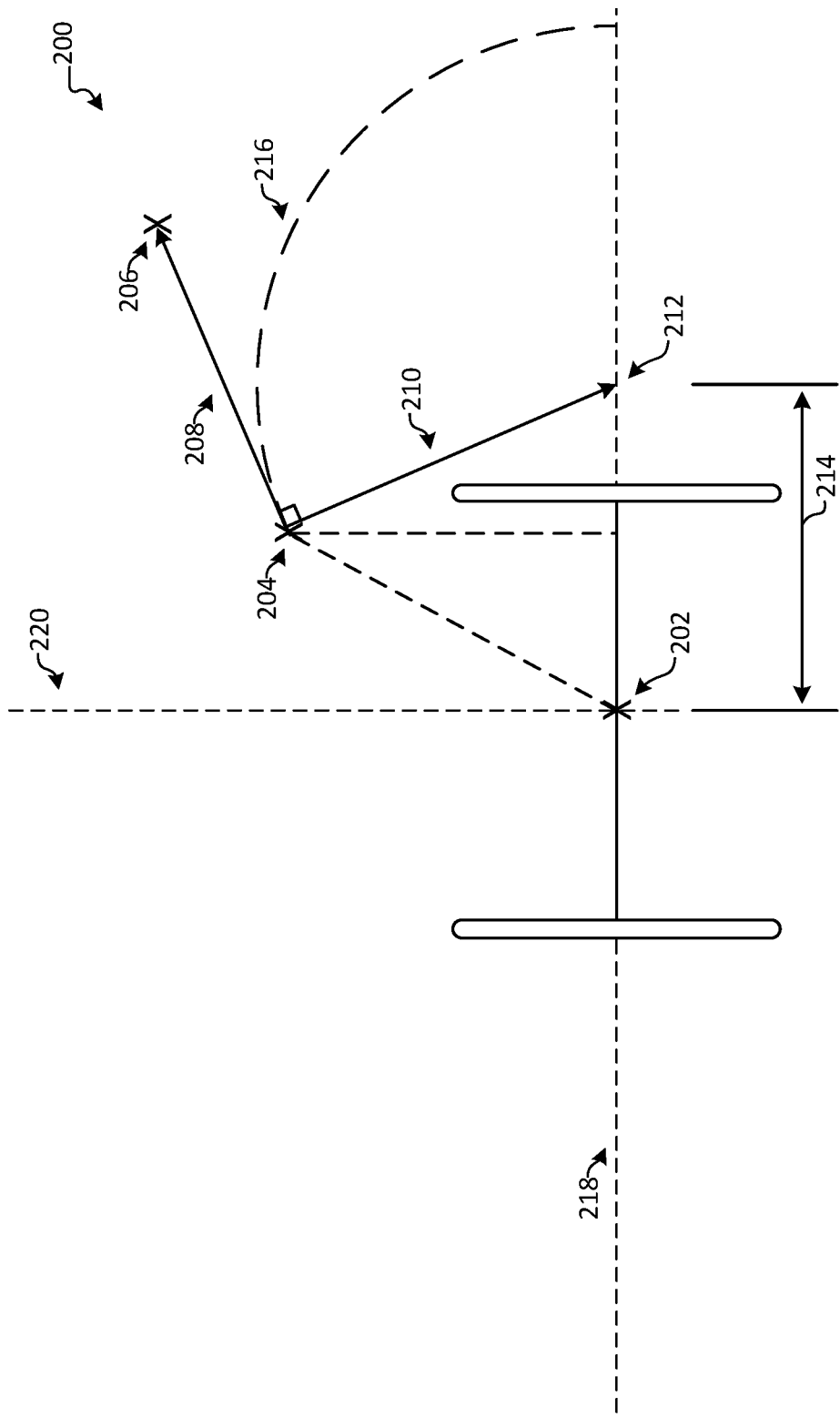
FIGS. 2A-2B illustrate overviews of example robot systems according to aspects disclosed herein.

A robot may use a writing instrument to create an illustration. As an example, a writing instrument may be a pen, a pencil, a paint brush, or a stylus, among other instruments. In some examples, the writing instrument may be positioned away from the center of the robot, wherein the center may be a point about which the robot may rotate. For example, a two-wheeled robot may have a center that is located at the midpoint of the axel connecting the two wheels, while a four-wheeled robot may rotate about a center that is equidistant from the four wheels. While example robots and center points are discussed herein, it will be appreciated that a robot may have any of a variety of features without departing from the spirit of this disclosure.

Due to the difference between the location of the writing instrument and the center of the robot, different movements may be used when generating an illustration as compared to generating an illustration with a writing instrument located at the center of the robot. For example, to draw a square, a two-wheeled robot having a writing instrument at its center may draw lines and rotate in place to form the different edges of the square. By contrast, performing a similar rotation in place with a robot having an off-center writing instrument may instead yield an arc or curve. As such, the systems and methods disclosed herein relate to illustration robot movement.

FIGS. 1A-1C illustrate overviews of example aspects of a robot. As will be discussed in greater detail below, FIG. 1A is a side view of an example robot, FIG. 1B is a top view of an example robot, and FIG. 1C is a simplified top view of an example robot.

FIG. 1A comprises a side view of robot 100. As illustrated, robot 100 comprises body 102, wheels 104, arms 106, and writing instrument 108. Wheels 104 may be used to move robot 100 when illustrating using writing instrument 108. While robot 100 is shown as having two wheels, it will be appreciated that fewer or additional wheels, as well as alternative movement mechanisms and techniques, may be used without departing from the spirit of this disclosure. As discussed above, writing instrument 108 may be a pen, a pencil, a paint brush, or a stylus, among other instruments. Writing instrument 108 may be held by robot 100 using one of arms 106. In some examples, writing instrument 108 may be raised or lowered to cause writing instrument 108 to come into contact with an illustration surface (e.g., a piece of paper, a canvas, a touch-sensitive screen, etc.). In other examples, writing instrument 108 may be detachable, such that different writing instruments may be substituted in its place. Robot 100 may move using wheels 104 in order to create an illustration using writing instrument 108. As an example, robot 100 may move wheels 104 at similar speeds in order to create a straight line or may move wheels 104 at different speeds in order to turn or rotate.

FIG. 1B illustrates a top view of robot 110. As shown, robot 110 comprises body 112, wheels 114, arms 116, and writing instrument 118. Body 112 is illustrated with an "X" in the center, indicating the center of robot 110. When robot rotates in place using wheels 114, robot 110 may rotate about the "X" shown in body 112. FIG. 1C illustrates a simplified top view of robot 120. The center 122 of robot 120 is illustrated by the "X" in between wheels 124. As discussed above, robot 120 may rotate about center 122 indicated by the "X" when rotating in place (e.g., spinning wheels 124 in opposite directions). Writing instrument 126 may be used to create an illustration. The "X" at writing instrument 126 illustrates the location from which an illustration will be created when robot 120 moves. Thus, when robot 120 rotates in place, an arc or curve may be illustrated using writing instrument 126. Accordingly, robot 120 may use aspects described herein to move writing instrument 126 in a straight line while turning or rotating.

FIG. 2A illustrates an overview of an example robot system 200 according to aspects disclosed herein. System 200 is comprised of robot center 202, writing instrument location 204, and destination location 206. The robot may currently be located at robot center 202, and may have received an instruction to draw a line along vector 208 from writing instrument location 204 to destination location 206. Given that vector 208 is not parallel to the current orientation of the robot (e.g., as illustrated by vertical axis 220), the robot may turn while illustrating in order to move the writing instrument in a straight line approximately along vector 208. Thus, the rate at which each wheel of the robot moves may be varied in order to create the illustration.

Robot system 200 comprises wheel axis 218, which may be an extension of the axel of the robot. Perpendicular vector 210 may be perpendicular to vector 208, beginning from writing instrument location 204. As illustrated, perpendicular vector 210 intersects wheel axis 216 at point 212. Accordingly, the robot may begin to rotate the writing instrument about point 212 to create an illustration that is tangent to vector 208. In order to rotate the writing instrument about point 212, the wheels of the robot may move at different speeds, so as to cause the robot to move in an arc having radius 214, which is the distance between robot center 202 and point 212. Thus, while the robot moves along the arc having radius 214, the writing instrument may follow arc 216. As illustrated, the initial movement of the writing instrument along arc 216 may be tangent to vector 208, while later movements may arc further from vector 208. Accordingly, the movement of the robot and writing instrument may be periodically recalculated or adjusted according to aspects disclosed herein in order to maintain movement of the writing instrument approximately along vector 208.

Figure 2B:
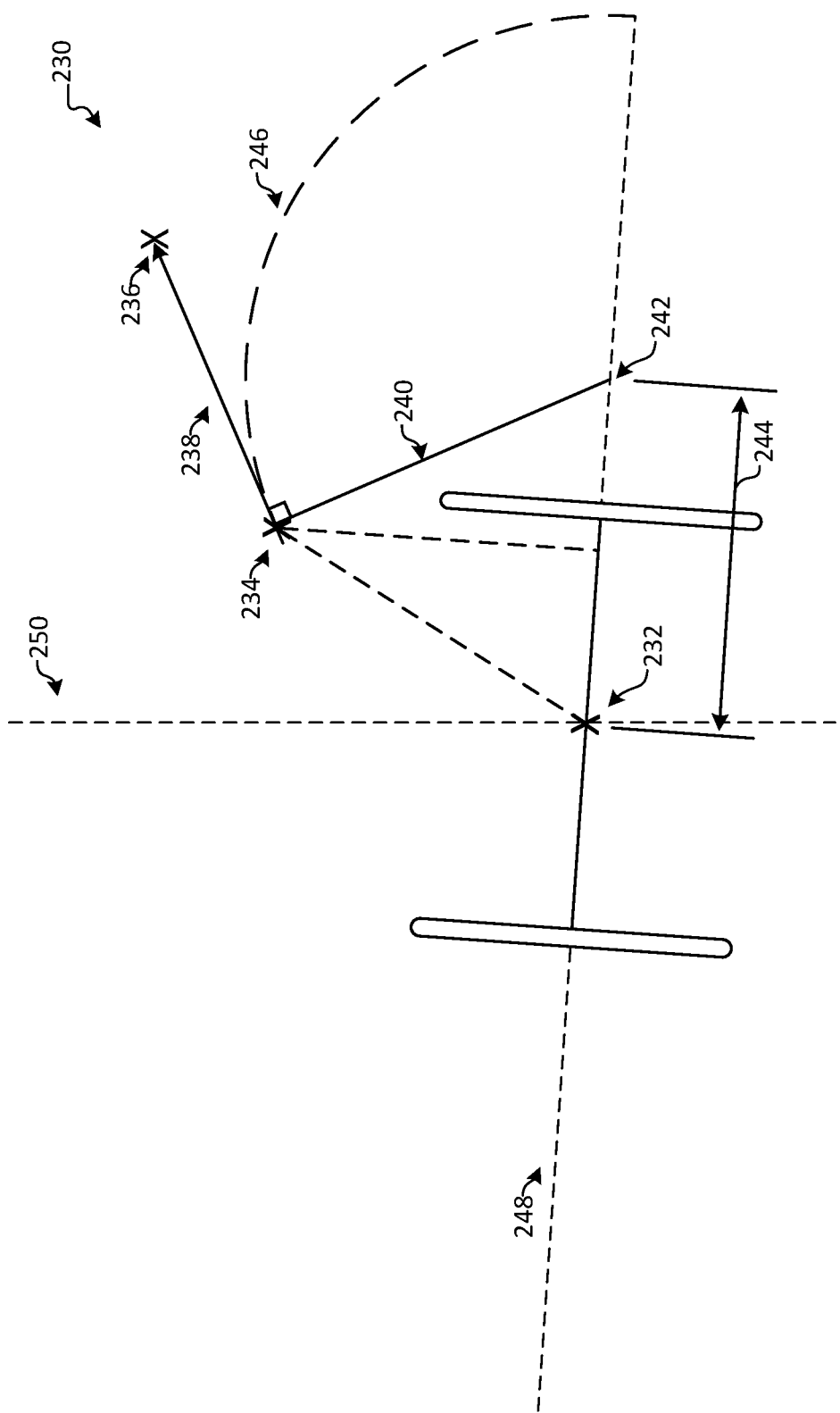

FIG. 2B illustrates an overview of an example robot system 230 according to aspects disclosed herein. System 230 may be a later illustration of system 200 discussed above with respect to FIG. 2A, wherein the robot has illustrated a part of vector 208 (presently illustrated in FIG. 2B as vector 238) by moving the writing instrument along arc 216 in FIG. 2A. Accordingly, writing instrument location 234 has progressed along vector 238 as a result of the robot rotating about point 212 in FIG. 2A. However, in order to maintain the position of the writing instrument along vector 238 (rather than following arc 216 in FIG. 2A), the movement of the robot may be periodically recalculated or adjusted (e.g., based on time, based on a sensed location for the robot, etc.). Thus, as illustrated in robot system 230, the robot may currently be located at robot center 232. Wheel axis 248 may be an extension of the axel of the robot, while vertical axis 250 may provide a frame of reference for the initial orientation of the robot.

Perpendicular vector 240 may be perpendicular to vector 238, beginning from the updated writing instrument location 234. As illustrated, perpendicular vector 240 intersects wheel axis 248 at point 242. Accordingly, the robot may now instead rotate the writing instrument about point 242 (instead of point 212 in FIG. 2A) to continue illustrating tangent to vector 238. In order to rotate the writing instrument about point 242, the wheels of the robot may move at different speeds, so as to cause the robot to move in an arc having radius 244, which is the distance between robot center 232 and point 242. Thus, while the robot moves along the arc having radius 244, the writing instrument may follow arc 246. As illustrated, the updated movement of the writing instrument along arc 246 may be tangent to vector 238, while later movements may arc further from vector 238. Accordingly, the movement of the robot and writing instrument may again be further recalculated or adjusted according to aspects disclosed herein in order to maintain movement of the writing instrument approximately along vector 238. FIGS. 2A and 2B are provided as examples of a robot generating an illustration along a vector. In examples, completing the illustration comprises performing similar computations and adjustments as described above until the writing instrument has moved to the destination location.

Figure 3A:
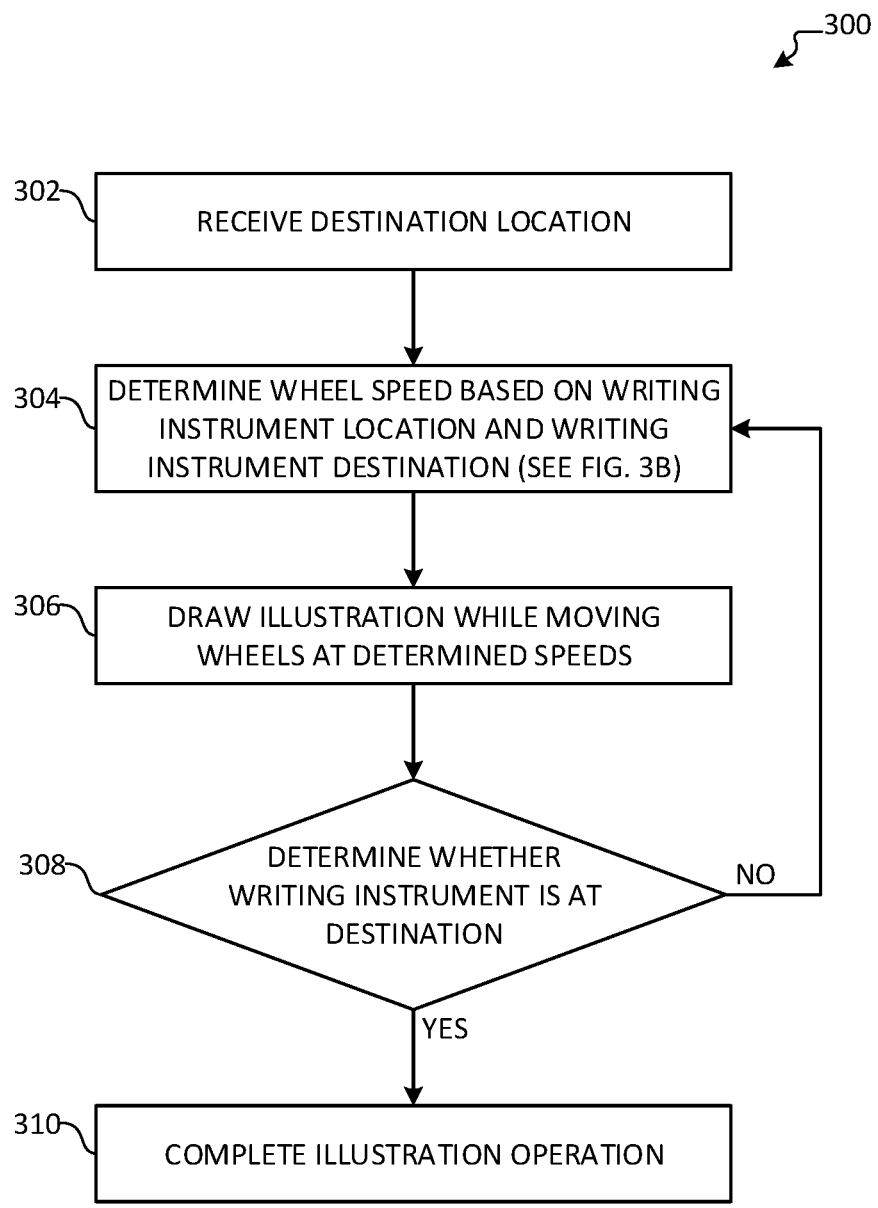
FIG. 3A illustrates an overview of an example method for generating robot movement.

FIG. 3A illustrates an overview of an example method 300 for generating robot movement. In an example, method 300 may be performed by a robot, such as robot 100 in FIG. 1. In some examples, at least a part of method 300 may be performed by a computing device, including, but not limited to, a mobile computing device, a tablet computing device, a distributed computing device, a laptop computing device, or a desktop computing device. Method 300 begins at operation 302, where a destination location may be received. In an example, the destination location may be received from a server or other computing device, wherein the destination location may indicate a coordinate to which the robot should move a writing instrument. In another example, the destination location may be accessed (e.g., from memory, from a local data store, etc.). The destination location may be part of a drawing, wherein the drawing is comprised of one or more destination locations among which the writing instrument should move. In some examples, the destination location may comprise a draw indicator, wherein the draw indicator specifies whether the robot should cause the writing instrument to contact a writing surface (e.g., by raising or lowering the writing instrument using an arm, such as one of arms 106 in FIG. 1).

Moving to operation 304, wheel speed for the robot may be determined based on the writing instrument location. As will be discussed in greater detail below with respect to FIG. 3B, the wheel speeds may be determined so as to cause the robot to rotate or turn. The determination may be made locally by the robot, may be made remotely (e.g., by a server or other computing device), or any combination thereof. In some examples, the determination may be based on the location of the writing instrument, the location of the center of the robot, the distance to the destination location, or the orientation of the robot with respect to the destination location, among other considerations. In other examples, the determination may comprise determining a ratio of wheel speeds with respect to each other, whereas the actual speed of the robot may be based on one or more factors, including, but not limited to, maintaining a constant drawing speed, the size of the illustration, or the distance to be traveled by the robot.

At operation 306, the illustration may be created by moving the wheels at the determined wheel speeds. This may comprise raising or lowering the writing instrument (e.g., as may have been specified by a draw indication when the destination location was received) or monitoring the progress of the robot using an onboard camera or other sensor (e.g., a proximity sensor, a light sensor, etc.). As discussed above with respect to FIGS. 2A and 2B, the movement of the robot may be recalculated or adjusted. Accordingly, flow progresses to operation 308, where a determination may be made whether the writing instrument has arrived at the destination location. If it is determined that the writing instrument is at the destination location, flow branches "YES" to operation 310, where the illustration operation completes. Completing the illustration operation may comprise providing an indication that the illustration is complete or accessing or receiving a new destination location (e.g., after which aspects of method 300 may be performed for the new destination location), among other operations. Flow terminates at operation 310.

If, however, it is determined that the writing instrument is not at the destination, flow branches "NO" to operation 304, where a wheel speed determination may be made. In some examples, the wheel speed may be maintained, wherein the determined wheel speed is similar to the wheel speed that was previously determined at operation 304. In other examples, an updated wheel speed may be determined based on the location of the writing instrument, the location of the center of the robot, the distance to the destination location, or the orientation of the robot with respect to the destination location, among other considerations. The updated wheel speed may be different so as to rotate the robot in order to maintain the path of the writing instrument along a vector rather than moving the writing instrument along an arc, as was discussed above with respect to FIGS. 2A and 2B. Flow loops between operations 304 and 308, such that the wheel speeds may be periodically adjusted until the writing instrument arrives at the received destination location and flow terminates at operation 310, as discussed above.

Figure 3B:
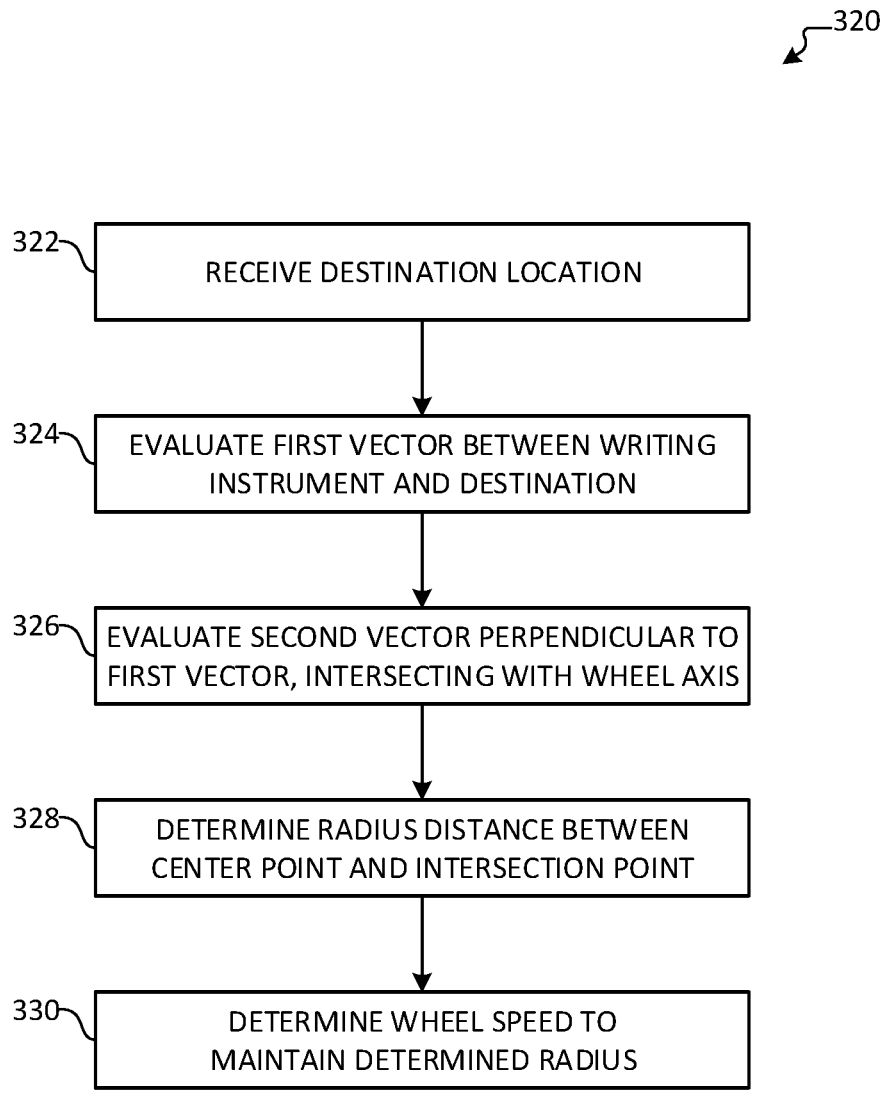
FIG. 3B illustrates an overview of an example method for generating robot movement.

FIG. 3B illustrates an overview of an example method for generating robot movement. In an example, method 320 may be performed by a robot, such as robot 100 in FIG. 1. In some examples, aspects of method 320 may be performed by a computing device, including, but not limited to, a mobile computing device, a tablet computing device, a distributed computing device, a laptop computing device, or a desktop computing device. In examples, aspects of method 320 may be performed to determine a wheel speed while generating an illustration, such as at operation 304 of method 300 described above.

Method 320 begins at operation 322, where a destination location may be received. In an example, the destination location may be received from a server or other computing device, wherein the destination location may indicate a coordinate to which the robot should move a writing instrument. In some examples, the destination location may comprise a draw indicator, wherein the draw indicator specifies whether the robot should cause the writing instrument to contact a writing surface (e.g., by raising or lowering the writing instrument using an arm, such as one of arms 106 in FIG. 1). In another example, the destination location may be accessed (e.g., from memory, from a local data store, etc.). The destination location may be part of a drawing, wherein the drawing is comprised of one or more destination locations among which the writing instrument should move.

Moving to operation 324, a first vector between the writing instrument location and the destination location may be evaluated. The first vector may represent the path that the writing instrument should travel in order to create an illustration between the current position of the writing instrument and the destination location (e.g., vectors 208 and 238 in FIGS. 2A and 2B, respectively). At operation 326, a second vector may be evaluated, wherein the second vector may be perpendicular to the first vector and may begin at the location of the writing instrument (e.g., perpendicular vectors 210 and 240 in FIGS. 2A and 2B, respectively). The second vector may intersect the wheel axis of the robot, wherein the wheel axis may represent a line perpendicular to the forward direction of the robot running through the center of the robot (e.g., wheel axes 218 and 248 in FIGS. 2A and 2B, respectively).

At operation 328, a radius may be determined between the center point of the robot and the intersection point of the second vector with the wheel axis. As an example, the determined radius may be similar to radii 214 or 244 in FIGS. 2A and 2B, respectively). As discussed above, the radius may be associated with the arc on which the robot may travel in order to move the writing instrument along the first vector between the writing instrument location and the destination location.

Moving to operation 330, wheel speed may be determined so as to maintain the determined radius. Determining the wheel speed may comprise determining a ratio for the wheels of the robot, such that the robot may rotate as a result of the different wheel speeds. For example, if the distance between a first and second wheel is the wheel base (WB), the ratio of the speed of the right wheel to the speed of the left wheel (e.g., $\omega_L/\omega_R$), given the radius (r) determined at operation 328, may be determined by the following equation:

$$\frac{\omega_L}{\omega_R} = \frac{r + \frac{1}{2}WB}{r - \frac{1}{2}WB}$$

The actual wheel speed may then be based on the determined ratio in view of one or more factors, including, but not limited to, maintaining a constant drawing speed, the size of the illustration, or the distance to be traveled by the robot. In examples, the determined wheel speed may be used to generate at least a part of an illustration (e.g., as described above at operation 306 of method 300). In some examples, aspects of method 320 may be performed repeatedly (as indicated by the loop between operations 304-308 in method 300) so as to update the arc traveled by a robot when generating an illustration (e.g., for lines that aren't straight, etc.) according to aspects described herein. Flow terminates at operation 330.

While FIGS. 3A and 3B are discussed with respect to determining wheel speeds (and, in some instances, with respect to a two-wheeled robot), it will be appreciated that other movement techniques may be used without departing from the spirit of this disclosure.

Figure 4:
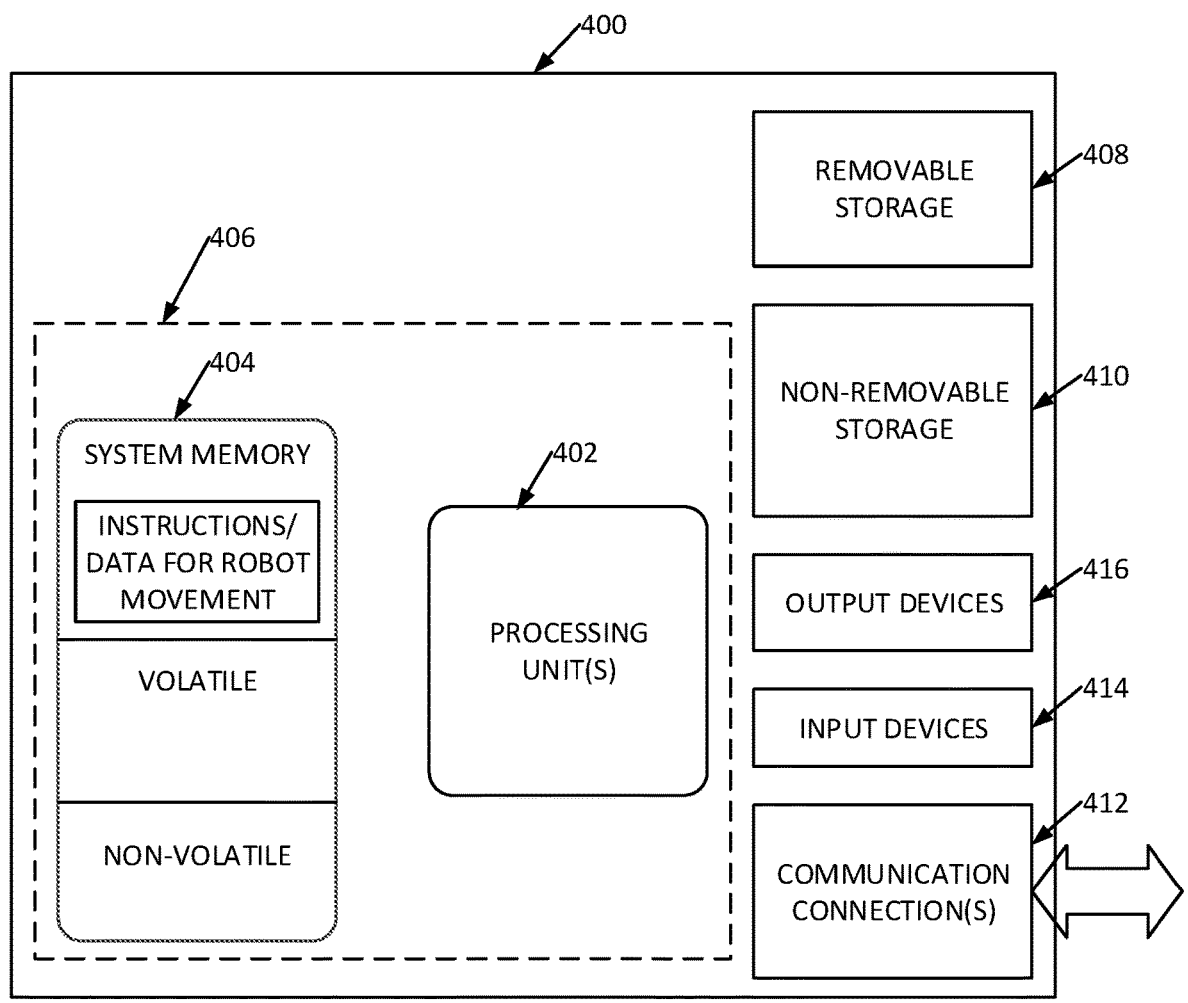
FIG. 4 illustrates an example operating environment in which one or more of the present embodiments may be implemented.

FIG. 4 illustrates an example operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (instructions to perform the robot movement operations disclosed herein) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system for creating an illustration by a robot, comprising: at least one processor; and memory encoding computer executable instructions that, when executed by the at least one processor, perform a method. The method comprises: accessing a destination location for a writing instrument of the robot, wherein the robot comprises a writing instrument at a writing instrument location and a plurality of wheels; generating a first vector between the writing instrument location and the destination location; generating a second vector perpendicular to the first vector, wherein the second vector passes through the writing instrument location; identifying an intersection point of the second vector and a wheel axis, wherein the wheel axis is perpendicular to a forward direction for the robot and passes through a center point of the robot; determining a radius between the center point of the robot and the intersection point; generating, based on the determined radius, a wheel speed for each of the plurality of wheels to move the robot along an arc having a radius of the determined radius and a center of the intersection point; and causing each of the plurality of wheels of the robot to move at the generated wheel speed for each of the plurality of wheels. In an example, the destination location is part of a drawing comprising a plurality of destination locations. In another example, the method further comprises: generating a second wheel speed for each of the plurality of wheels to move the robot along a second arc, wherein at least a part of the second arc is determined to maintain a path of the writing instrument along the first vector; and causing each of the plurality of wheels of the robot to move at the determined second wheel speed for each of the plurality of wheels. In a further example, the method further comprises: determining the destination location is associated with a draw indicator; and adjusting a height of the writing instrument in relation to an illustration surface based on the draw indicator. In yet another example, the wheel speed for each of the plurality of wheels is generated based at least in part on at least one of: maintaining a constant drawing speed of the robot; a physical size associated with a drawing comprising the destination location; and a distance to be traveled by the robot. In a further still example, the method further comprises: determining whether the writing instrument is at the destination location; and when it is determined that the writing instrument is at the destination location, accessing a second destination location from the drawing. In another example, the drawing is received from a computing device.

In another aspect, the technology relates to a method for generating an illustration by an illustration robot. The method comprises: receiving, from a computing device, a drawing comprising one or more destination locations for a writing instrument of the illustration robot, wherein the writing instrument is located at a writing instrument location; accessing a destination location from the drawing; determining whether the destination location is parallel to a forward direction of the illustration robot; when it is determined that the destination location is not parallel to the forward direction, generating a wheel speed for each of a plurality of wheels of the illustration robot to move the illustration robot along an arc, wherein at least a part of the arc is determined to maintain a path of the writing instrument along a vector from the writing instrument location to the destination location; and causing each of the plurality of wheels of the illustration robot to move at the generated wheel speed for each of the plurality of wheels. In an example, the method further comprises: generating a second wheel speed for each of the plurality of wheels to move the illustration robot along a second arc, wherein at least a part of the second arc is determined to maintain a path of the writing instrument along the vector; and causing each of the plurality of wheels of the robot to move at the determined second wheel speed for each of the plurality of wheels. In another example, determining the arc comprises: generating a first vector between the writing instrument location and the destination location; generating a second vector perpendicular to the first vector, wherein the second vector passes through the writing instrument location; identifying an intersection point of the second vector and a wheel axis, wherein the wheel axis is perpendicular to a forward direction for the illustration robot and passes through a center point of the illustration robot; determining a radius between the center point of the illustration robot and the identified intersection point; and generating the arc having a radius of the determined radius and a center of the identified intersection point. In a further example, the method further comprises: determining the destination location is associated with a draw indicator; and adjusting a height of the writing instrument in relation to an illustration surface based on the draw indicator. In yet another example, the wheel speed for each of the plurality of wheels is generated based at least in part on at least one of: maintaining a constant drawing speed of the illustration robot; a physical size associated with the drawing; and a distance to be traveled by the illustration robot. In a further still example, the method further comprises: determining whether the writing instrument is at the destination location; and when it is determined that the writing instrument is at the destination location, accessing a second destination location from the drawing.

In a further aspect, the technology relates to another method for creating an illustration by a robot. The method comprises: accessing a destination location for a writing instrument of the robot, wherein the robot comprises a writing instrument at a writing instrument location and a plurality of wheels; generating a first vector between the writing instrument location and the destination location; generating a second vector perpendicular to the first vector, wherein the second vector passes through the writing instrument location; identifying an intersection point of the second vector and a wheel axis, wherein the wheel axis is perpendicular to a forward direction for the robot and passes through a center point of the robot; determining a radius between the center point of the robot and the intersection point; generating, based on the determined radius, a wheel speed for each of the plurality of wheels to move the robot along an arc having a radius of the determined radius and a center of the intersection point; and causing each of the plurality of wheels of the robot to move at the generated wheel speed for each of the plurality of wheels. In an example, the destination location is part of a drawing comprising a plurality of destination locations. In another example, the method further comprises: generating a second wheel speed for each of the plurality of wheels to move the robot along a second arc, wherein the second arc is determined to maintain the path of the writing instrument along the first vector; and causing each of the plurality of wheels of the robot to move at the determined second wheel speed for each of the plurality of wheels. In a further example, the method further comprises: determining the destination location is associated with a draw indicator; and adjusting a height of the writing instrument in relation to an illustration surface based on the draw indicator. In yet another example, the wheel speed for each of the plurality of wheels is generated based at least in part on at least one of: maintaining a constant drawing speed of the robot; a physical size associated with a drawing comprising the destination location; and a distance to be traveled by the robot. In a further still example, the method further comprises: determining whether the writing instrument is at the destination location; and when it is determined that the writing instrument is at the destination location, accessing a second destination location from the drawing. In another example, the drawing is received from a computing device.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for creating an illustration by a robot, comprising:
   at least one processor; and
   memory encoding computer executable instructions that, when executed by the at least one processor, perform a method comprising:
   accessing a destination location for a writing instrument of the robot, wherein the robot comprises a writing instrument at a writing instrument location and a plurality of wheels;
   generating a first vector between the writing instrument location and the destination location;
   generating a second vector perpendicular to the first vector, wherein the second vector passes through the writing instrument location;
   identifying an intersection point of the second vector and a wheel axis, wherein the wheel axis is perpendicular to a forward direction for the robot and passes through a center point of the robot;
   determining a radius between the center point of the robot and the intersection point;
   generating, based on the determined radius, a wheel speed for each of the plurality of wheels to move the robot along an arc having a radius of the determined radius and a center of the intersection point; and
   causing each of the plurality of wheels of the robot to move at the generated wheel speed for each of the plurality of wheels.

2. The system of claim 1, wherein the destination location is part of a drawing comprising a plurality of destination locations.

3. The system of claim 2, wherein the method further comprises:
   determining whether the writing instrument is at the destination location; and
   when it is determined that the writing instrument is at the destination location, accessing a second destination location from the drawing.

4. The system of claim 2, wherein the drawing is received from a computing device.

5. The system of claim 1, wherein the method further comprises:

generating a second wheel speed for each of the plurality of wheels to move the robot along a second arc, wherein at least a part of the second arc is determined to maintain a path of the writing instrument along the first vector; and causing each of the plurality of wheels of the robot to move at the determined second wheel speed for each of the plurality of wheels.

6. The system of claim 1, wherein the method further comprises:
determining the destination location is associated with a draw indicator; and
adjusting a height of the writing instrument in relation to an illustration surface based on the draw indicator.

7. The system of claim 1, wherein the wheel speed for each of the plurality of wheels is generated based at least in part on at least one of:
maintaining a constant drawing speed of the robot;
a physical size associated with a drawing comprising the destination location; and
a distance to be traveled by the robot.

8. A method for generating an illustration by an illustration robot, comprising:
receiving, from a computing device, a drawing comprising one or more destination locations for a writing instrument of the illustration robot, wherein the writing instrument is located at a writing instrument location;
accessing a destination location from the drawing;
determining whether the destination location is parallel to a forward direction of the illustration robot;
when it is determined that the destination location is not parallel to the forward direction, generating a wheel speed for each of a plurality of wheels of the illustration robot to move the illustration robot along an arc, wherein at least a part of the arc is determined to maintain a path of the writing instrument along a vector from the writing instrument location to the destination location; and
causing each of the plurality of wheels of the illustration robot to move at the generated wheel speed for each of the plurality of wheels.

9. The method of claim 8, further comprising:
generating a second wheel speed for each of the plurality of wheels to move the illustration robot along a second arc, wherein at least a part of the second arc is determined to maintain a path of the writing instrument along the vector; and
causing each of the plurality of wheels of the robot to move at the determined second wheel speed for each of the plurality of wheels.

10. The method of claim 8, wherein determining the arc comprises:
generating a first vector between the writing instrument location and the destination location;
generating a second vector perpendicular to the first vector, wherein the second vector passes through the writing instrument location;
identifying an intersection point of the second vector and a wheel axis, wherein the wheel axis is perpendicular to a forward direction for the illustration robot and passes through a center point of the illustration robot;
determining a radius between the center point of the illustration robot and the identified intersection point; and
generating the arc having a radius of the determined radius and a center of the identified intersection point.

11. The method of claim 8, further comprising:
determining the destination location is associated with a draw indicator; and
adjusting a height of the writing instrument in relation to an illustration surface based on the draw indicator.

12. The method of claim 8, wherein the wheel speed for each of the plurality of wheels is generated based at least in part on at least one of:
maintaining a constant drawing speed of the illustration robot;
a physical size associated with the drawing; and
a distance to be traveled by the illustration robot.

13. The method of claim 8, further comprising:
determining whether the writing instrument is at the destination location; and
when it is determined that the writing instrument is at the destination location, accessing a second destination location from the drawing.

14. A method for creating an illustration by a robot, comprising:
accessing a destination location for a writing instrument of the robot, wherein the robot comprises a writing instrument at a writing instrument location and a plurality of wheels;
generating a first vector between the writing instrument location and the destination location;
generating a second vector perpendicular to the first vector, wherein the second vector passes through the writing instrument location;
identifying an intersection point of the second vector and a wheel axis, wherein the wheel axis is perpendicular to a forward direction for the robot and passes through a center point of the robot;
determining a radius between the center point of the robot and the intersection point;
generating, based on the determined radius, a wheel speed for each of the plurality of wheels to move the robot along an arc having a radius of the determined radius and a center of the intersection point; and
causing each of the plurality of wheels of the robot to move at the generated wheel speed for each of the plurality of wheels.

15. The method of claim 14, wherein the destination location is part of a drawing comprising a plurality of destination locations.

16. The method of claim 15, further comprising:
determining whether the writing instrument is at the destination location; and
when it is determined that the writing instrument is at the destination location, accessing a second destination location from the drawing.

17. The method of claim 15, wherein the drawing is received from a computing device.

18. The method of claim 14, further comprising:
generating a second wheel speed for each of the plurality of wheels to move the robot along a second arc, wherein the second arc is determined to maintain the path of the writing instrument along the first vector; and
causing each of the plurality of wheels of the robot to move at the determined second wheel speed for each of the plurality of wheels.

19. The method of claim 14, further comprising:
determining the destination location is associated with a draw indicator; and
adjusting a height of the writing instrument in relation to an illustration surface based on the draw indicator.

20. The method of claim 14, wherein the wheel speed for each of the plurality of wheels is generated based at least in part on at least one of:
   maintaining a constant drawing speed of the robot;
   a physical size associated with a drawing comprising the destination location; and
   a distance to be traveled by the robot.

* * * * *